(12) United States Patent
Vuorinen

(10) Patent No.: US 8,262,849 B2
(45) Date of Patent: Sep. 11, 2012

(54) APPARATUS AND METHOD FOR MANUFACTURING FIBRE MASS SUSPENSION

(75) Inventor: Timo Vuorinen, Tampere (FI)

(73) Assignee: Metso Paper, Inc., Helsinki (FI)

( * ) Notice: Subject to any disclaimer, the term of this patent is extended or adjusted under 35 U.S.C. 154(b) by 178 days.

(21) Appl. No.: 12/677,095

(22) PCT Filed: Sep. 11, 2008

(86) PCT No.: PCT/FI2008/050503
§ 371 (c)(1),
(2), (4) Date: Mar. 8, 2010

(87) PCT Pub. No.: WO2009/034230
PCT Pub. Date: Mar. 19, 2009

(65) Prior Publication Data
US 2010/0206500 A1    Aug. 19, 2010

(30) Foreign Application Priority Data
Sep. 14, 2007  (FI) .................................. 20075643

(51) Int. Cl.
*D21B 1/32* (2006.01)
*D21B 1/34* (2006.01)
*B07B 1/00* (2006.01)
(52) U.S. Cl. ............... 162/4; 162/28; 162/261; 209/17
(58) Field of Classification Search ............... 162/4, 28, 162/261; 209/3, 17
See application file for complete search history.

(56) References Cited

U.S. PATENT DOCUMENTS

| 4,397,713 A | 8/1983 | Lambrecht |
| 4,708,295 A | 11/1987 | Musselmann |
| 4,812,205 A | 3/1989 | Silveri et al. |

FOREIGN PATENT DOCUMENTS

| EP | 0812950 A1 | 12/1997 |
| WO | 2009034230 A1 | 3/2009 |

OTHER PUBLICATIONS

Gallagher Brian, Pressure Screening, Jul. 2005, TAPPI, TAPPI 2005 Improving screening and cleaning efficiencies short course, p. 1-48.*
Written Opinion of the International Searching Authority issued in PCT/FI2008/050503.
Search Report issued in PCT/FI2008/050503.

* cited by examiner

*Primary Examiner* — Anthony Calandra
(74) *Attorney, Agent, or Firm* — Stiennon & Stiennon

(57) ABSTRACT

A fiber mass suspension is produced by mixing together a fiber material (FM) and water (W) in a pulper (1). The formed fiber mass suspension is divided into an accept fraction and a reject fraction. The reject fraction is supplied continuously to a first secondary pulper (2) for further screening and defibring. The accept fraction formed in the first secondary pulper (2) is supplied continuously for further processing and the reject fraction formed in the first secondary pulper (2) is supplied continuously to a second secondary pulper (3) for further processing. The accept fraction formed in the second secondary pulper (3) is supplied continuously for further processing.

20 Claims, 1 Drawing Sheet

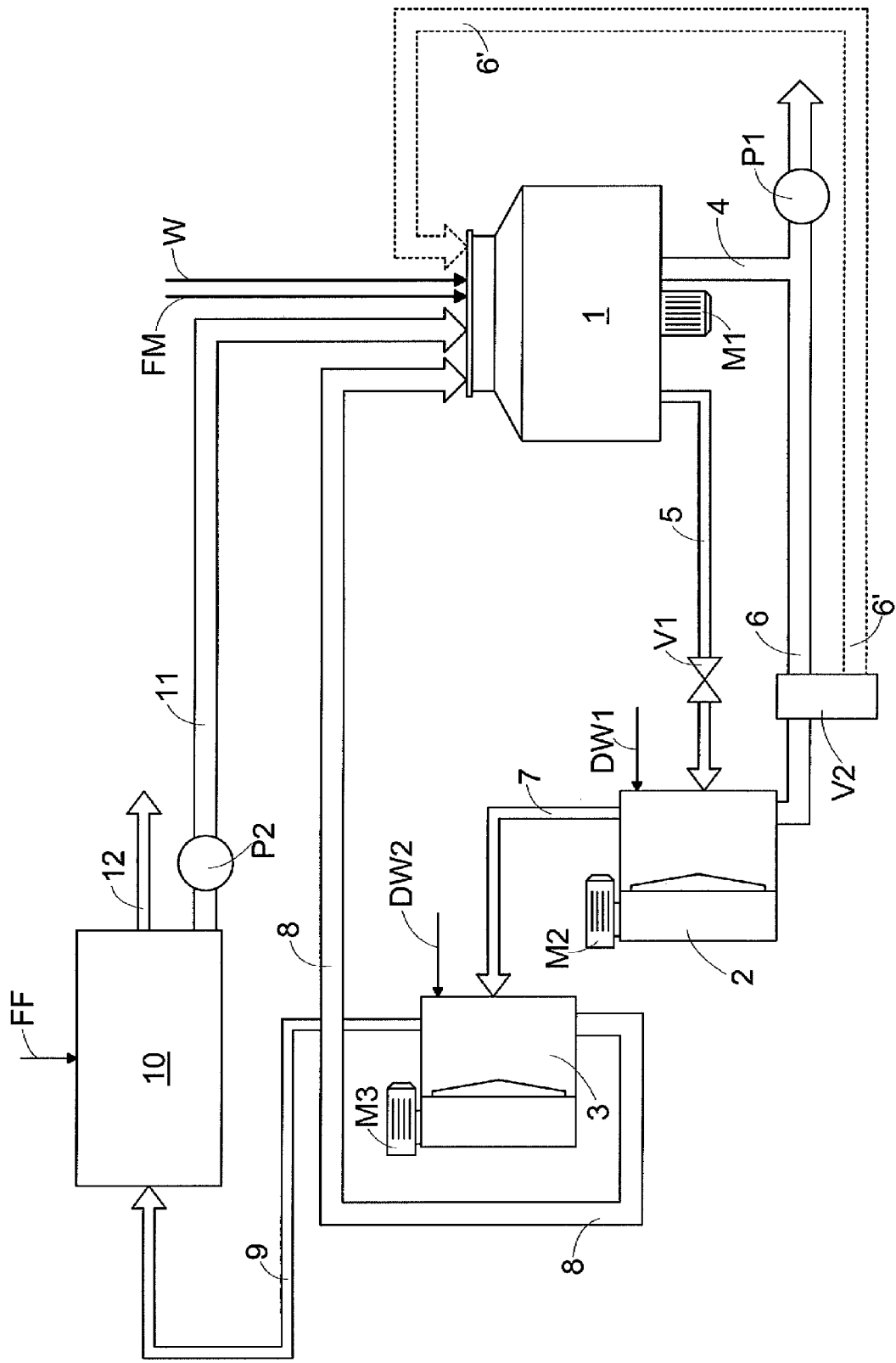

APPARATUS AND METHOD FOR MANUFACTURING FIBRE MASS SUSPENSION

CROSS REFERENCES TO RELATED APPLICATIONS

This application is a U.S. national stage application of International App. No. PCT/FI2008/050503, filed Sep. 11, 2008, the disclosure of which is incorporated by reference herein, and claims priority on Finnish App. No. 20075643, filed Sep. 14, 2007, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to an apparatus for manufacturing a fiber mass suspension, the apparatus comprising a pulper for mixing together a fiber material and water so as to produce a fiber mass suspension and for dividing the fiber mass suspension into an accept fraction and a reject fraction, the accept fraction being arranged to be forwarded to a further treatment process of the fiber mass suspension and the reject fraction being arranged to be supplied for further processing.

The invention further relates to a method of manufacturing a fiber mass suspension, the method comprising producing the fiber mass suspension by an apparatus which comprises a pulper, the method comprising producing the fiber mass suspension by mixing together a fiber material and water in the pulper, dividing the fiber mass suspension into an accept fraction and a reject fraction, forwarding the accept fraction to a further treatment process of the fiber mass suspension, and supplying the reject fraction for further processing.

At an initial stage of manufacturing a fiber mass suspension, such as a fiber mass suspension to be used for manufacturing paper and cardboard, pulpering may be used as one part of the process. The purpose of pulpering is to defiber a fiber material to be fed to a pulper provided in the pulpering system as well as to mix the fiber material with water to be fed to the pulper so as to produce a fiber mass suspension. The fiber material to be used may be e.g. cellulose or a recycled fiber material or a fiber-containing material from a paper or cardboard factory.

The accept, which is a portion that has passed through a screen plate provided at the bottom of the pulper, is supplied further in the fiber mass suspension manufacturing process. A portion of the fiber mass suspension that does not pass the screen plate, i.e. the reject, is further supplied to a secondary pulper by means of a reject removal pump. The secondary pulper continues processing the reject, dividing it into an accept part and a reject part. The reject formed in the secondary pulper is further supplied to a drum screen for the purpose of recovering from the reject received from the secondary pulper fibers still remaining therein for a fiber mass suspension manufacturing process. The remaining material, i.e. the reject formed at the drum screen, in turn, is removed from the process, to be burned outside the process, for instance.

Typically, such a process has to be used e.g. such that during a reject collecting phase the reject is allowed to flow from the pulper to the secondary pulper for a predetermined period of time, after which the reject flow from the pulper to the secondary pulper is prevented. Next starts a reject deflaking phase wherein a reject mass received from the pulper is processed for further screening and defibering. A material sufficiently defibered at the secondary pulper may be supplied as the accept of the secondary pulper back to the pulper. The next phase is to start is reject washing wherein water is supplied to the secondary pulper to wash fiber material from the reject; the fiber material may be further supplied to the pulper. The reject that remained at the secondary pulper is supplied to the drum screen, wherefrom water and fiber are recovered to the process and the precipitated reject is supplied to reject processing. During reject processing, the flow of any new reject material from the pulper to the secondary pulper is thus prevented. According to another use, the flow of the reject material from the pulper to the secondary pulper is prevented for at least until the reject that remained at the secondary pulper has been fed to the drum screen. In both cases, the process thus has to be used as a kind of a load or batch process such that for most of the time the flow of the reject from the pulper to the secondary pulper is prevented. Consequently, the pulpering system requires two secondary pulpering systems in parallel in order to achieve a higher output.

SUMMARY OF THE INVENTION

An object of the present invention is to provide a novel pulpering system for manufacturing a fiber mass suspension.

The apparatus according to the invention is characterized in that the apparatus further comprises a first secondary pulper arranged in series with the pulper and a second secondary pulper arranged in series with the first secondary pulper such that the first secondary pulper is arranged to receive continuously the reject fraction formed in the pulper for further screening and defibering, and that the accept fraction formed in the first secondary pulper is arranged to be supplied continuously for further processing, and that the reject fraction formed in the first secondary pulper is arranged to be supplied continuously to the second secondary pulper for further screening and defibering, and that the accept fraction formed in the second secondary pulper is arranged to be supplied continuously for further processing, and that the reject fraction formed in the second secondary pulper is arranged to be supplied for further processing.

The method according to the invention is characterized by the apparatus for manufacturing a fiber mass suspension further comprising a first secondary pulper arranged in series with the pulper and a second secondary pulper arranged in series with the first secondary pulper, the method further comprising supplying the reject fraction continuously to the first secondary pulper for further screening and defibering, supplying continuously the accept fraction formed in the first secondary pulper for further processing, supplying continuously the reject fraction formed in the first secondary pulper to the second secondary pulper for further screening and defibering, supplying continuously the accept fraction formed in the second secondary pulper for further processing, and supplying the reject fraction formed in the second secondary pulper for further processing.

The apparatus for manufacturing a fiber mass suspension comprises a pulper for mixing together a fiber material and water so as to produce a fiber mass suspension and for dividing the fiber mass suspension into an accept fraction and a reject fraction, the accept fraction being arranged to be forwarded to a further treatment process of the fiber mass suspension and the reject fraction being arranged to be supplied for further processing. The apparatus further comprises a first secondary pulper arranged in series with the pulper and a second secondary pulper arranged in series with the first secondary pulper such that the first secondary pulper is arranged to receive continuously the reject fraction formed in the pulper for further screening and defibering, and the accept fraction formed in the first secondary pulper is arranged to be supplied continuously for further processing, and the reject fraction formed in the first secondary pulper is arranged to be supplied continuously to the second secondary pulper for further screening and defibering. Further, the accept fraction formed in the second secondary pulper is arranged to be supplied continuously for further processing, and the reject fraction formed in the second secondary pulper is arranged to be supplied for further processing.

Owing to the continuous accept flow from the secondary pulpers, the production capacity of the apparatus is higher than that of the previously known two parallel systems. In addition, owing to at least the continuous reject removal from the first secondary pulper, "rope formation", i.e. accumulation of the reject into an elongated rope, is reduced; consequently, the final result of pulpering is better and malfunctions and the need for cleaning in the apparatus are reduced.

According to an embodiment, the accept fraction formed in the first secondary pulper is arranged to be supplied continuously to a further treatment process of the fiber mass suspension for further processing. This enables the fiber mass suspension that has been sufficiently defibered at the first secondary pulper to be removed from the pulpering system, thus increasing the capacity of the system.

According to a second embodiment, the accept fraction formed in the first secondary pulper is arranged to be supplied continuously to the pulper for further defibering, thus enabling the quality of the fiber mass suspension to be further increased by defibering it more.

According to a third embodiment, the reject fraction formed in the second secondary pulper is arranged to be supplied for further processing in reject screening wherein the reject fraction supplied from the second secondary pulper is arranged to be divided into a fiber-containing accept fraction and a reject fraction to be removed from the fiber mass suspension manufacturing process. Such reject screening enables some valuable fiber material to be even further recovered from the reject to the process.

According to a fourth embodiment, the reject fraction formed in the second secondary pulper is arranged to be supplied continuously to reject screening for further processing, in which case the aforementioned rope formation is even further reduced.

According to a fifth embodiment, the reject fraction formed in the second secondary pulper is arranged to be supplied occasionally batchwise to reject screening for further processing, which makes the concentration of the reject to be transferred to reject screening easy to increase. In such a case, the fiber content of the reject to be removed from the second secondary pulper is reduced, which increases the yield of fiber material.

BRIEF DESCRIPTION OF THE DRAWINGS

Some embodiments of the invention will be described in closer detail in the accompanying FIGURE, which schematically shows a pulpering system.

For the sake of clarity, the FIGURE shows some embodiments of the invention in a simplified manner.

DESCRIPTION OF THE PREFERRED EMBODIMENTS

The FIGURE schematically shows a pulpering system. The pulpering system shown in the FIGURE comprises a pulper 1, a first secondary pulper 2 arranged in series with the pulper 1, and a second secondary pulper 3 arranged in series with the first secondary pulper 2. The pulper 1 is used for producing a fiber mass suspension by mixing together a fiber material and water therein. In the FIGURE, the supply of water to the pulper 1 is shown by arrow W and the supply of fiber material to the pulper 1 is shown by arrow FM. The pulper 1 shown in the FIGURE may be a cylindrical pulper or a vertical pulper provided with a vertically positioned rotor which is rotated by a motor M1 and which, when rotating at a high speed, defibers the fiber material supplied to the pulper 1, mixing it with water. The consistency of the fiber mass suspension in the pulper 1 is typically 3 to 8%, but may also be 1 to 10%. Typically, the fiber material is a recycled fiber material but may also be a waste material recovered from a paper or cardboard manufacturing process or cellulose. Rotation of the rotor of the pulper 1 generates a strong turbulence in the pulper 1 such that particles that are heavier than fibers, such as large fiber bundles and various impurities originating from the recycled fiber material, such as sand and pieces of plastic and metal, constituting a heavier matter, drift to the edges of the pulper 1. The rotation speed of the rotor of the pulper 1 may be controlled e.g. by controlling the rotation speed of the motor M1 by means of a frequency converter.

Over a middle part of the pulper 1, the fiber material slowly settles downwards. The lower part of the pulper 1 is provided with a screen plate having perforations provided therein so as to enable a sufficiently defibered material to pass therethrough. This portion, which has passed through the perforations of the screen plate, is called the accept fraction of the pulper 1, and it is forwarded to a further treatment process of the fiber mass suspension along an accept channel 4 of the pulper 1. Typically, the accept channel 4 is provided with an accept pump P1 for forwarding the accept in the channel 4. The further treatment process of the fiber mass suspension may comprise e.g. perforation screening, i.e. coarse screening, a subsequent slot screening, i.e. fine screening and, therebetween or thereafter, removal of sand by means of vortex cleaners. After these phases, the fiber mass suspension may be supplied via precipitation to a short circulation of a paper or cardboard machine in order to be used in the manufacture of paper or cardboard. The portion of the fiber mass suspension which accumulates on the edges of the pulper 1 and contains various impurities, i.e. the reject fraction of the pulper 1, is transferred continuously along a reject channel 5 of the pulper 1 to the first secondary pulper 2. Typically, the pulper 1 is positioned higher in the process than the first secondary pulper 2, so that the difference of height suffices to transfer the reject material of the pulper 1 to the first secondary pulper 2. When necessary, the reject channel 5 may be provided with a pump to transfer the reject material of the pulper 1 to the first secondary pulper 2. In the case shown in the FIGURE, the reject channel 5 of the pulper 1 is provided with a schematically shown valve V1, which in normal use is usually kept completely open. When necessary, the valve V1 may also be closed if, for one reason or another, the flow of the reject from the pulper 1 to the first secondary pulper 2 is to be prevented. The lower part of the pulper 1 may also be provided with a junk trap (omitted from the FIGURE for the sake of clarity) into which the heaviest components in the fiber mass suspension fall and wherefrom such components may be removed occasionally. Since the structure and operational principle of various pulpers suitable for use as the pulper 1 are obvious per se to one skilled in the art, they will not be discussed in further detail herein.

The reject fraction received from the pulper 1 is further screened and defibered in the first secondary pulper 2. Such a secondary pulper is a screening and defibering pulper wherein the screening and defibering are carried out by means of a rotor and a screen plate. The first secondary pulper 2 may be a pulper preferably provided in a horizontal position or, alternatively, in a vertical position or in another position, and having a pulpering space preferably of a cylindrical shape or, alternatively, of a conical shape, or with curved walls. The secondary pulper is preferably provided with a planar screen plate or, alternatively, a conical screen plate, such that the side facing the pulpering space thereof is provided with a rotating rotor. The material that has passed the screen plate is transferred to the accept space and therefrom further out of the secondary pulper. The reject material of the secondary pulper is generally removed via a fitting arranged in the pulpering space of the secondary pulper. The first secondary pulper 2 is driven by the power of a motor M2. The rotation speed of the motor M2 may be controlled e.g. by means of a frequency converter. When necessary, the consistency of the reject received by the first secondary pulper 2 may be controlled by feeding the pulper 2 with dilution water; this is shown schematically in the FIGURE by means of arrow DW1. A portion which has defibered sufficiently in the first secondary pulper 2, i.e. the accept fraction that has passed the screen plate of the first secondary pulper 2, is forwarded continuously via an accept channel 6 of the first secondary pulper 2 to a further treatment process of the fiber mass suspension. The accept channel 6 of the first secondary pulper 2 may then be connected to the accept channel 4 of the pulper 1 before the pump P1, as schematically shown in the FIGURE, so that the pump P1 may also be used for forwarding the accept fraction of the first secondary pulper 2 to a further treatment process of the fiber mass suspension. Alternatively, this accept fraction of the first secondary pulper 2 may also be transferred continuously e.g. back to the pulper 1 for further processing, i.e. for further defibering, or, instead of the pulper 1, somewhere else for further processing. This alternative is schematically shown in FIG. 1 by means of an accept channel 6' shown in a broken line. In such a case, the accept channel 6 of the first secondary pulper 2 may be provided as schematically shown e.g. with a directional valve V2 in order to guide the accept to the accept channel 6' which leads to the pulper 1. If necessary, the accept channel 6' may be provided with a pump for forwarding the accept fraction of the first secondary pulper 2 in the accept channel 6'.

A portion of the reject of the pulper 1 received by the first secondary pulper 2 which is not transferred as the accept fraction to the accept channel 6 or 6' is transferred continuously as the reject fraction of the first secondary pulper 2 out of the first secondary pulper 2 to the second secondary pulper 3 along a reject channel 7 of the first secondary pulper 2. Typically, the first secondary pulper 2 and the second secondary pulper 3 arranged in series generate a sufficient pressure in the system such that it is not necessary to provide the reject channel 7 with a pump for transferring the reject fraction of the first secondary pulper 2 to the second secondary pulper 3.

A portion of the reject of the first secondary pulper 2 received by the second secondary pulper 3 which is not transferred as the accept fraction to the accept channel 8 is transferred as the reject fraction of the second secondary pulper 3 from the second secondary pulper 3 to reject screening 10 along a reject channel 9 of the second secondary pulper 3. Typically, the first secondary pulper 2 and the second secondary pulper 3 arranged in series generate a sufficient pressure in the system such that it is not necessary to provide the reject channel 9 of the second secondary pulper 3 with a pump for forwarding the reject fraction of the second secondary pulper 3. The reject fraction formed in the second secondary pulper 3 may be supplied continuously to reject screening 10. The reject fraction formed in the second secondary pulper 3 may be supplied to the reject screening 10 also occasionally batchwise if the concentration of the reject to be supplied to reject screening 10 is to be increased. In such a case, the fiber content of the reject to be removed from the second secondary pulper 3 is reduced, which increases the yield of fiber material.

In reject screening 10, the aim is to recover any fibers still remaining in the reject as completely as possible. A drum screen, for instance, may be used for screening the reject, in which case the aim is to wash the fibers from the reject supplied into the drum by utilizing a flushing flow supplied to the drum, shown schematically in the FIGURE by arrow FF. Fibers that have been successfully separated from the reject are transferred out of the drum via apertures provided in the drum barrel of the drum and forwarded as the accept along an accept channel 11 of the reject screening 10 back to the pulper 1. If the reject screening 10 is positioned higher than the pulper 1, the accept fraction obtained from reject screening may flow freely to the pulper 1, but when necessary, its flow may be enhanced by means of a pump P2 provided in the accept channel 11. The reject remaining after reject screening 10 is removed from the fiber mass suspension manufacturing process along a reject channel 12 of the reject screening 10, for instance to be burned or otherwise destroyed. When a drum screen is used for reject screening 10, the reject material is removed from the drum screen via an end of the cylindrical part of the drum screen. A vibrating screen or another reject precipitating or screening device may also be used for reject screening 10.

Owing to the continuous accept flow occurring from the first secondary pulper 2 and the second secondary pulper 3, the production capacity of the presented pulpering system is higher than that of the previously known two parallel systems. Owing to at least the continuous removal of reject occurring from the first secondary pulper 2, "rope formation", i.e. accumulation of the reject into an elongated rope, is reduced; consequently, the end result of the pulpering is better and malfunctions and the need for cleaning in the pulpering system are reduced. The presented solution is particularly useful when very dirty fiber materials which require extensive disintegration, such as very dirty recycled fiber materials, are used, when the pulper 1 used is typically a vertical pulper. The fiber material supplied to the pulper 1 may also be the fiber-containing reject of a drum pulper. However, the presented system may also be used when processing a cleaned or sorted recycled fiber material consisting of office paper exclusively.

In some cases, the features set forth in the present application may be used as such, irrespective of other features. On the other hand, the features disclosed in the present application may be combined, when necessary, so as to provide various combinations.

The drawings and the related description are only intended to illustrate the idea of the invention. The details of the invention may vary within the scope of the claims.

The invention claimed is:

1. An apparatus for manufacturing a fiber mass suspension, comprising:

a first pulper having an un-pulped fiber material inlet, a water inlet, a rotor arranged to be driven by a motor, a screen plate leading to an accept outlet, and a reject outlet in receiving relation to material which does not pass through the screen, the first pulper for mixing together fiber material and water so as to produce a fiber mass suspension and for dividing the fiber mass suspension into an accept fraction and a reject fraction, the accept fraction being arranged to be forwarded to a further treatment process of the fiber mass suspension and the reject fraction being arranged to be supplied for further processing;

a first secondary pulper having an inlet connected to the reject outlet of the first pulper so that the first secondary pulper is arranged in series with the first pulper, the first secondary pulper having a second rotor arranged to be driven by a second motor, a second screen plate leading to an accept outlet, and a reject outlet in receiving relation to material which does not pass through the second screen;

wherein the accept outlet of the first secondary pulper is connected to an inlet of the first pulper or to a channel to which the accept outlet of the first pulper is also connected, and forms a continuous source of pulp to the inlet of the first pulper or the channel;

a second secondary pulper having an inlet connected to the reject outlet of the first secondary pulper so that the second secondary pulper is arranged in series with the first secondary pulper, the second secondary pulper having a third rotor arranged to be driven by a third motor, a third screen plate leading to an accept outlet, and a reject outlet in receiving relation to material which does not pass through the third screen plate;

wherein the accept outlet of the second secondary pulper forms a continuous source of pulp;

wherein the reject outlet of the first pulper forms a continuous source of the reject fraction of the first pulper, which is connected by a first reject channel to the first secondary pulper inlet;

wherein the reject outlet of the first secondary pulper forms a continuous source of the reject fraction of the first secondary pulper, which is connected by a second reject channel to the second secondary pulper inlet; and wherein the reject outlet of the second secondary pulper is connected to a further processing apparatus.

2. The apparatus of claim 1, wherein the accept outlet of the first secondary pulper is connected to the channel to which the accept outlet of the first pulper is also connected.

3. The apparatus of claim 1, wherein the accept outlet of the first secondary pulper is connected to an inlet of the first pulper.

4. The apparatus of claim 1, wherein the accept outlet of the second secondary pulper is connected to an inlet of the first pulper, so that the continuous source of fiber formed by the accept outlet of the second secondary pulper is connected to the first pulper.

5. The apparatus of claim 1, wherein the further processing apparatus to which the reject outlet of the second secondary pulper is connected is a reject screen having a fiber-containing fraction outlet, and a reject fraction outlet connected outside of the apparatus for manufacturing a fiber mass suspension.

6. The apparatus of claim 5, wherein the reject fraction outlet of the second secondary pulper forms a continuous source of rejects connected to the reject screen.

7. The apparatus of claim 5, wherein reject fraction outlet of the second secondary pulper forms a batchwise source of rejects connected to the reject screen.

8. The apparatus of claim 5 wherein the fiber-containing fraction outlet is connected to an inlet of the first pulper.

9. The apparatus of claim 5, wherein the reject screen is a drum screen.

10. The apparatus of claim 1 wherein the first pulper is a vertical pulper or a cylindrical pulper.

11. A method of manufacturing a fiber mass suspension, the method comprising the steps of:

producing a fiber mass suspension in a first pulper by mixing together at least one un-pulped fiber material selected from the group consisting of a recycled fiber material, waste material recovered from a paper or cardboard manufacturing process, or office paper and water in the first pulper;

dividing the fiber mass suspension into an accept fraction and a reject fraction, forwarding the accept fraction to a further treatment process of the fiber mass suspension, and supplying the reject fraction to a first secondary pulper arranged in series with the first pulper;

wherein the reject fraction from the first pulper is supplied continuously to the first secondary pulper for further screening and defibering, and wherein an accept fraction and a reject fraction are formed in the first secondary pulper;

supplying continuously the accept fraction formed in the first secondary pulper for further processing;

supplying continuously the reject fraction formed in the first secondary pulper to a second secondary pulper for further screening and defibering, wherein an accept fraction and a reject fraction are formed in the second secondary pulper;

supplying continuously the accept fraction formed in the second secondary pulper for further processing; and supplying the reject fraction formed in the second secondary pulper for further processing.

12. The method of claim 11, wherein the step of supplying continuously the accept fraction formed in the first secondary pulper for further processing, comprises supplying continuously the accept fraction formed in the first secondary pulper to further treatment with the accept fraction formed in the first pulper in the further treatment process of the fiber mass suspension.

13. The method of claim 11, wherein the step of supplying continuously the accept fraction formed in the first secondary pulper to further processing comprises supplying continuously the accept fraction formed in the first secondary pulper to the first pulper for further defibering.

14. The method of claim 11 wherein the step of supplying continuously the accept fraction formed in the first secondary pulper for further processing comprises supplying continuously the accept fraction formed in the first secondary pulper to the first pulper for further defibering.

15. The method of claim 11 wherein the step of supplying the reject fraction formed in the second secondary pulper for further processing comprises supplying the reject fraction formed in the second secondary pulper to reject screening and dividing the reject fraction supplied from the second secondary pulper into a fiber-containing accept fraction and a reject fraction which reject fraction is removed from the fiber mass suspension manufacturing process.

16. The method of claim 15 wherein the step of supplying the reject fraction formed in the second secondary pulper to reject screening is performed continuously.

17. The method of claim 15 wherein the step of supplying the reject fraction formed in the second secondary pulper to reject screening is performed occasionally batchwise.

18. The method of claim 15 further comprising the step of supplying the accept fraction formed in the reject screening to the first pulper for further defibering.

19. The method of claim 15 further comprising the step of dividing the reject fraction supplied from the second secondary pulper into a fiber-containing accept fraction is performed in a drum screen which divides the reject fraction supplied from the second secondary pulper into the fiber-containing accept fraction and the reject fraction to be removed from the fiber mass suspension manufacturing process.

20. A method of manufacturing a fiber mass suspension, the method comprising the steps of:
    producing a fiber mass suspension in a first pulper by mixing together water and an un-pulped fiber material comprised of at least one of: a recycled fiber material, waste material recovered from a paper or cardboard manufacturing process, office paper, or fiber containing waste from a drum pulper, in the first pulper;
    dividing the fiber mass suspension into an accept fraction and a reject fraction, forwarding the accept fraction to a further treatment process of the fiber mass suspension, and
    supplying the reject fraction to a first secondary pulper arranged in series with the first pulper;
    wherein the reject fraction from the first pulper is supplied continuously to the first secondary pulper for further screening and defibering, and wherein an accept fraction and a reject fraction are formed in the first secondary pulper;
    supplying continuously the accept fraction formed in the first secondary pulper for further processing;
    supplying continuously the reject fraction formed in the first secondary pulper to a second secondary pulper for further screening and defibering, wherein an accept fraction and a reject fraction are formed in the second secondary pulper;
    supplying continuously the accept fraction formed in the second secondary pulper for further processing; and
    supplying the reject fraction formed in the second secondary pulper for further processing.

* * * * *

UNITED STATES PATENT AND TRADEMARK OFFICE
CERTIFICATE OF CORRECTION

PATENT NO. : 8,262,849 B2  
APPLICATION NO. : 12/677095  
DATED : September 11, 2012  
INVENTOR(S) : Timo Vuorinen Page 1 of 1

It is certified that error appears in the above-identified patent and that said Letters Patent is hereby corrected as shown below:

After Column 5, line 55, insert
-- The reject fraction received from the first secondary pulper 2 is further screened and defibered in the second secondary pulper 3. The structure of the second secondary pulper 3 may be as described above in connection with the first secondary pulper 2. The second secondary pulper 3 is driven by the power of a motor M3. The rotation speed of the motor M3 may be controlled e.g. by means of a frequency converter. When necessary, the consistency of the reject received by the second secondary pulper 3 may be controlled by feeding the second secondary pulper 3 with dilution water; this is shown schematically in the figure by means of arrow DW2. A portion which has defibered sufficiently in the second secondary pulper 3, i.e. the accept fraction that has passed the screen plate of the second secondary pulper 3, is transferred continuously back to the pulper 1 for further processing, since in practice the accept fraction that has passed the screen plate of the second secondary pulper 3 still requires further defibering in the pulper 1. Typically, the first secondary pulper 2 and the second secondary pulper 3 arranged in series generate a sufficient pressure in the system such that it is not necessary to provide an accept channel 8 of the second secondary pulper 3 with a pump for transferring the accept fraction of the second secondary pulper 3 to the pulper 1. --

Signed and Sealed this  
Twelfth Day of March, 2013

Teresa Stanek Rea  
*Acting Director of the United States Patent and Trademark Office*